US012653172B2

(12) United States Patent　　(10) Patent No.:　US 12,653,172 B2
Vaughn　　(45) Date of Patent:　Jun. 16, 2026

(54) FISHING LINE ATTACHMENT MECHANISM AND METHOD OF USE

(71) Applicant: Eric R. Vaughn, Plattsmouth, NE (US)

(72) Inventor: Eric R. Vaughn, Plattsmouth, NE (US)

( * ) Notice: Subject to any disclaimer, the term of this patent is extended or adjusted under 35 U.S.C. 154(b) by 304 days.

(21) Appl. No.: 18/337,188

(22) Filed: Jun. 19, 2023

(65) Prior Publication Data

US 2024/0415105 A1　　Dec. 19, 2024

(51) Int. Cl.
A01K 89/01　　(2006.01)
A01K 89/015　　(2006.01)

(52) U.S. Cl.
CPC .............................. A01K 89/01931 (2015.05)

(58) Field of Classification Search
CPC .......... A01K 89/0111; A01K 89/01931; A01K 89/003; B65H 75/28
See application file for complete search history.

(56) References Cited

U.S. PATENT DOCUMENTS

| | | | |
|---|---|---|---|
| 806,064 A | 11/1905 | Carter | |
| 2,309,146 A | 1/1943 | Whistler | |
| 2,326,510 A * | 8/1943 | Worden | .................. A01K 93/00 |
| | | | 43/43.15 |
| 2,669,400 A | 2/1954 | Wood | |
| 2,777,648 A * | 1/1957 | Wood | .................. B65H 75/2281 |
| | | | 242/125.1 |
| 2,842,322 A | 7/1958 | Bradshaw | |
| 4,103,843 A | 8/1978 | Northdurft | |
| 5,165,623 A * | 11/1992 | Smith | .............. A01K 89/01931 |
| | | | 242/587.1 |

| | | | |
|---|---|---|---|
| 5,507,443 A * | 4/1996 | Miyazaki | ............. A01K 89/015 |
| | | | 242/322 |
| 5,956,890 A * | 9/1999 | Hoffman, Jr. | .......... A01K 91/04 |
| | | | 403/360 |
| 6,015,111 A | 1/2000 | Berke | |
| 6,609,671 B2 * | 8/2003 | Heesch | .............. A01K 89/0111 |
| | | | 242/586 |
| 6,857,590 B2 | 2/2005 | Heesch | |
| 7,490,790 B1 | 2/2009 | Gruber et al. | |
| 2004/0113006 A1 * | 6/2004 | Heesch | .............. A01K 89/0111 |
| | | | 242/322 |
| 2009/0173814 A1 | 7/2009 | Hernandez et al. | |

FOREIGN PATENT DOCUMENTS

| | | | | |
|---|---|---|---|---|
| CA | 2516869 A1 * | 3/2006 | ............. A01K 91/03 |
| KR | 20210114847 A * | 9/2021 | ............. B65H 75/28 |
| KR | 1020210114847 A | 9/2021 | |
| WO | WO-2005018317 A1 * | 3/2005 | ......... A01K 89/0111 |

* cited by examiner

*Primary Examiner* — Emmanuel M Marcelo

(74) *Attorney, Agent, or Firm* — Erik M. Antonson; Advent, LLP

(57)　　　　　　ABSTRACT

The present disclosure relates in general to fishing tackle, and more specifically, to a fishing line attachment mechanism and method of use that provides for a quick, simple, and secure means of attaching fishing line to a fishing reel. The purpose of the invention is to avoid having to tie difficult knots when securing fishing line to the reel. Another purpose of the invention is to gradually introduce fishing line to an exterior of the reel to mitigate risk of line breakage. The attachment mechanism may include a head, body, tail, and seating on a spool of the fishing reel designed to insert and retain a knotted end of the fishing line therein. In some instances the attachment mechanism may further include an arm portion to help maintain the fishing line in a proper position on the spool.

22 Claims, 8 Drawing Sheets

FISHING LINE ATTACHMENT MECHANISM AND METHOD OF USE

FIELD OF THE INVENTION

The present invention relates in general to fishing tackle, and more particularly without limitation, to a mechanism and method for attaching a fishing line to a spool of a fishing reel.

BACKGROUND OF THE INVENTION

Fishing is a popular activity for people of all skill levels, from children to professional anglers. An important first step in any fishing excursion is attaching fishing line onto the spool of a fishing reel. Typically, this involves looping the fishing line around the spool and tying a knot to get a snug connection around the spool. It is important to get a snug connection so that as you wind the fishing line around the spool, the line does not slip and makes reeling in the fishing line easier while fishing. While a variety of knots are available for this purpose, each comes with a drawback. Simple knots are quick and easy but are prone to breaking or loosening. Loose knots can lead to slippage as the line is being reeled where the entire fishing line may coil and rotate around the spool. More complicated knots are less likely to allow for slippage but are frustrating to tie and often lead to incorrectly tied knots. Incorrectly tied knots can also lead to problems such as breakage or slippage.

Any knot will cause a protrusion where the knot sits on an exterior surface of the spool. This protrusion can interfere with smooth spooling, casting, and reeling. The fishing line may catch on the protrusion during casting which lessens the cast distance or creates a tangled, unusable line. Similar issues occur during reeling or casting as the line catches on the protrusion creating a continually worsening problem of uneven spooling and tangling.

Moreover, due to the time consuming, often frustrating, process of replacing old fishing line many anglers avoid replacing the line altogether. This can lead to losing a fish when the old, damaged line snaps at a critical moment.

In an attempt to overcome these shortfalls, manufacturers have developed a variety of fishing line attachment mechanisms including clips, central anchors, and various slots to engage the fishing line. However, problems persist with each of these methods. Clips fail to hold the line in place when pulled in a direction opposite the clip's hold. Central anchors waste line as additional line is needed to reach into the center of the spool to attach the line. Additionally, central anchors do not eliminate the need for a complex knot and the small area in which the central anchor sits can make it even more difficult to tie the knot needed to attach the line. Further, central anchors are often reached by threading the fishing line through one or more small holes in the reel which may be difficult for those with limited dexterity or eyesight.

Central anchors and existing slot mechanisms each have sharp edges over which the line must bend to enter onto the spool. This sharp edge often causes the line to snap as pressure is applied either during spooling or when reeling in a fish. These edges also create issues similar to those of the protrusion of a knot discussed above. Existing slot designs also fail to hold the knot in place when a force is applied from a direction opposite the slots path, leading to the line disengaging from the spool at a critical moment. Manufacturers have also utilized bands made of various materials for wrapping around spools to prevent rotation or slippage of the spooled line around the surface of the spool. These bands can be difficult to install on the spool, are easy to lose, and are prone to breaking or wearing out with repeated use.

Thus, a desire remains to provide a fishing line attachment mechanism and method of use which increases the efficiency of attaching a fishing line to a spool without the need for time consuming, difficult knots. A desire also remains to solve issues with the fishing line becoming caught on the protrusion of the knot on the exterior surface of the spool to allow for a more efficient, unobstructed casting and reeling of the line while fishing. A desire still further remains to solve issues created by having sharp edges over which the fishing line must bend to enter onto the spool to lessen the risk of line breakage when pressure is applied. Yet another desire remains to eliminate the need for additional products to prevent slippage of spooled line around the surface of the spool, in particular, products which are easy to lose or which are prone to breakage.

SUMMARY OF THE INVENTION

According to one aspect of the present disclosure, a fishing line attachment mechanism is provided. The fishing line attachment mechanism may comprise a barrel and at least a head and a body traversing through the barrel. The fishing line attachment mechanism may also comprise a tail extending parallel to the direction of spooling. The first end of the tail may also traverse through the barrel before the tail depth tapers to become flush with the exterior surface of the barrel. The attachment mechanism may be configured to allow for a fishing line to be securely retained by only a simple knot and to allow the fishing line to gradually enter the spool. Moreover, when in use, the attachment mechanism does not require the fishing line to bend over abrupt corners to enter the spool, mitigating line breakage. The attachment mechanism also does not require tying knots in confined areas within the spool or tying complicated knots, similar to traditional spools, which create protrusions on the exterior surface of the spool which often lead to uneven spooling and tangling.

Another aspect of the present disclosure is the fishing line attachment mechanism which further includes an arm connecting the body to the first end of the tail. The arm also traverses through the barrel. The arm provides additional means of securing the fishing line by further limiting the directions in which the line could move when engaged with the attachment mechanism. Preferably, the attachment mechanism becomes sufficiently narrow towards the first end of the tail to prevent the knot from sliding back through the barrel.

Yet another aspect of the present disclosure is a method of using the fishing line attachment mechanism. In particular, the method may comprise providing a fishing reel and fishing line with a knot on one end. The method may further include providing the fishing line attachment mechanism of the present disclosure. The method may then include taking the knotted end of the fishing line and inserting it into the head of the attachment mechanism, through the barrel, and further directing the line through the body and optionally the arm of the attachment mechanism. Finally, the method may include directing the fishing line into the first end of the tail before utilizing the tail to gradually introduce the fishing line onto the exterior of the barrel to allow for even spooling onto the reel.

Principal Objects and Advantages of the Invention

Therefore, it is a principal object, feature, and/or advantage of the present disclosure to overcome the aforementioned deficiencies in the art and provide a quick and convenient mechanism and method to securely attach a fishing line to a spool of a fishing reel.

Another object, feature, and/or advantage of the present disclosure is to lessen the amount of fishing line needed to attach the line to the spool.

Yet another object, feature, and/or advantage of the present disclosure is to eliminate the need for complicated knots, opening the sport of fishing to more people of various skill levels.

A further object, feature, and/or advantage of the present disclosure is to prevent fishing line slippage or breakage caused by loose, broken, or incorrectly tied knots.

A still further object, feature, and/or advantage of the present disclosure is to eliminate protrusions on an exterior surface of the spool caused by traditional means of attaching the fishing line.

Another object, feature, and/or advantage of the present disclosure is to allow for a smoother and more uniform spooling of the fishing line onto the spool.

Yet another object, feature, and/or advantage of the present disclosure is to gradually introduce the fishing line to the spool to lessen damage, breaking, loosening, tangling, and catching of the line during spooling, casting, or reeling.

A further object, feature, and/or advantage of the present disclosure is to allow for greater casting distance of the fishing line from the reel while fishing.

A still further object, feature, and/or advantage of the present disclosure is to lessen the risk of the fishing line becoming disengaged and detaching from the spool.

Another object, feature, and/or advantage of the present disclosure is to provide for better knot retention between the fishing line and the spool.

Yet another object, feature, and/or advantage of the present disclosure is to eliminate the need to thread the fishing line through small holes and eliminate the need to tie knots in confined areas such as within an internal cavity of the spool.

A further object, feature, and/or advantage of the present disclosure is to protect the knot of the fishing line from sun exposure which causes the line to become brittle and weak over time, leading to breakage.

A still further object, feature, and/or advantage of the present disclosure is to provide a fishing line attachment mechanism that may be utilized with various makes, models, and manufacturers of fishing reels, including, e.g., spinning reels, spincast reels, and baitcast reels.

Yet another object, feature, and/or advantage of the present disclosure is to eliminate the need for additional materials to be used in manufacturing the reel or for the purchase of additional materials to mitigate issues with line slippage caused by a poor connection of the fishing line to the spool, such as the bands used to wrap around spool to prevent the line from slipping.

Other objects, features, and advantages of this disclosure will become apparent from the following description taken in conjunction with the accompanying drawing wherein are set forth, by way of illustration and example and without limitation, certain aspects of this disclosure. The present disclosure is not to be limited to or by these objects, features, and advantages. No single aspect need provide each and every object, feature, or advantage.

BRIEF DESCRIPTION OF THE DRAWINGS

FIG. 1 is a front-top perspective view of a first aspect of the fishing line attachment mechanism on a spool of a fishing reel attached to a fishing rod.

FIG. 2 is a perspective exterior view of the spool showing a front side of the fishing line attachment mechanism of FIG. 1 without a fishing line attached.

FIG. 3 is a perspective exterior view of the spool showing the front side of the fishing line attachment mechanism of FIG. 1 with the fishing line attached.

FIG. 4 is a front-top perspective view of a second aspect of the fishing line attachment mechanism on the spool of the fishing reel attached to the fishing rod.

FIG. 5 is a perspective exterior view of the spool showing the front side of the fishing line attachment mechanism of FIG. 4 without a fishing line attached.

FIG. 6 is a perspective exterior view of the spool showing the front side of the fishing line attachment mechanism of FIG. 4 with the fishing line attached.

DETAILED DESCRIPTION OF THE INVENTION

Figure 1:
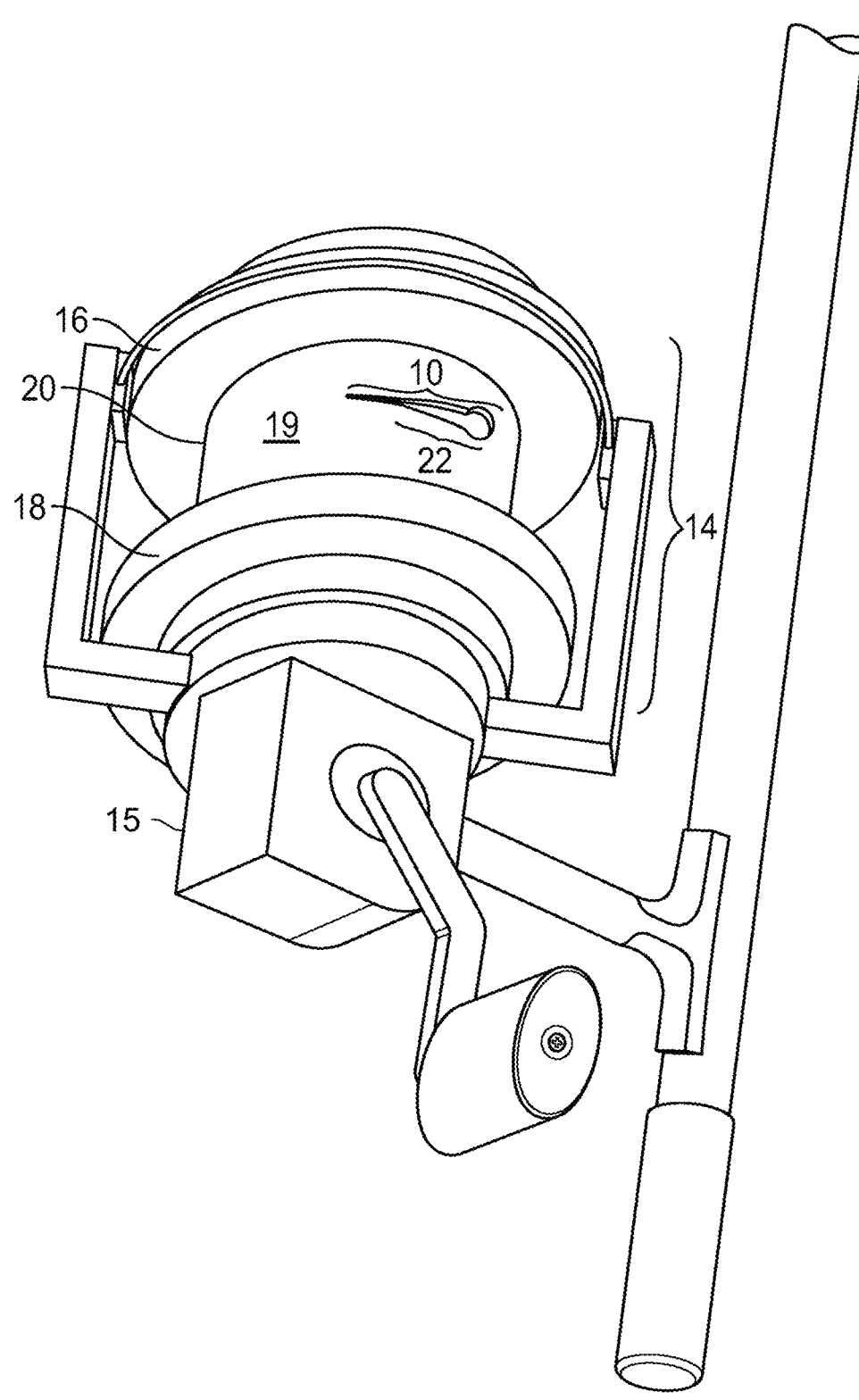
FIGS. 1-6 represent examples of a fishing line attachment mechanism and method of use of the present disclosure.
Figure 2:
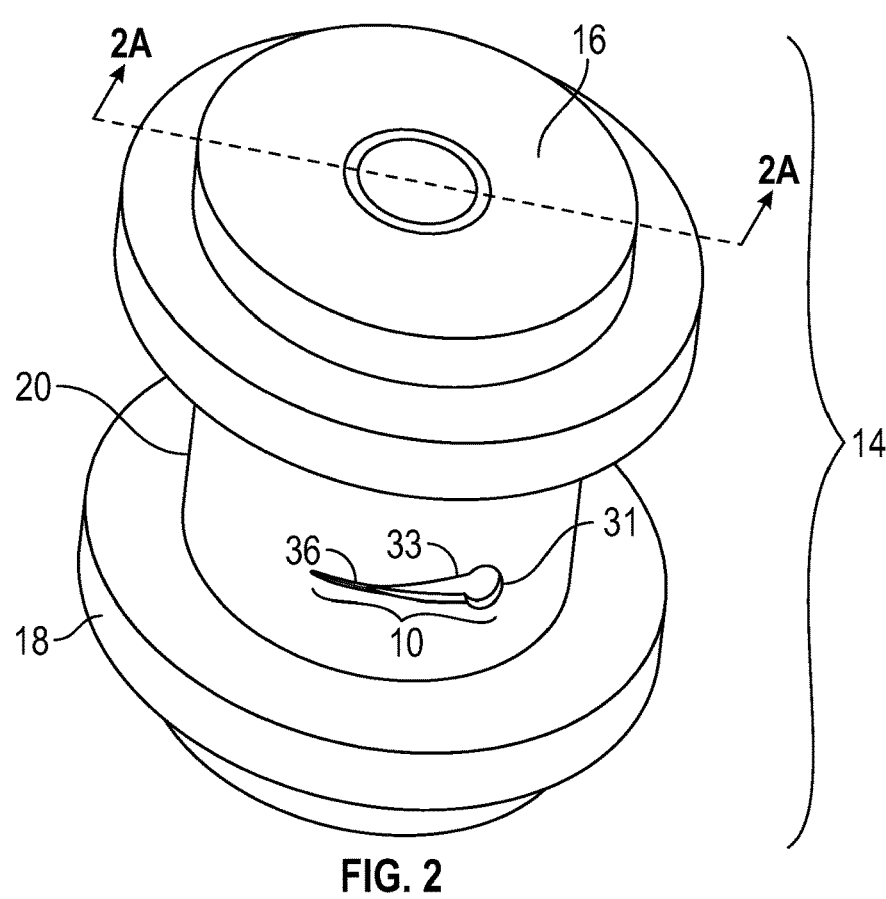
Figure 3:
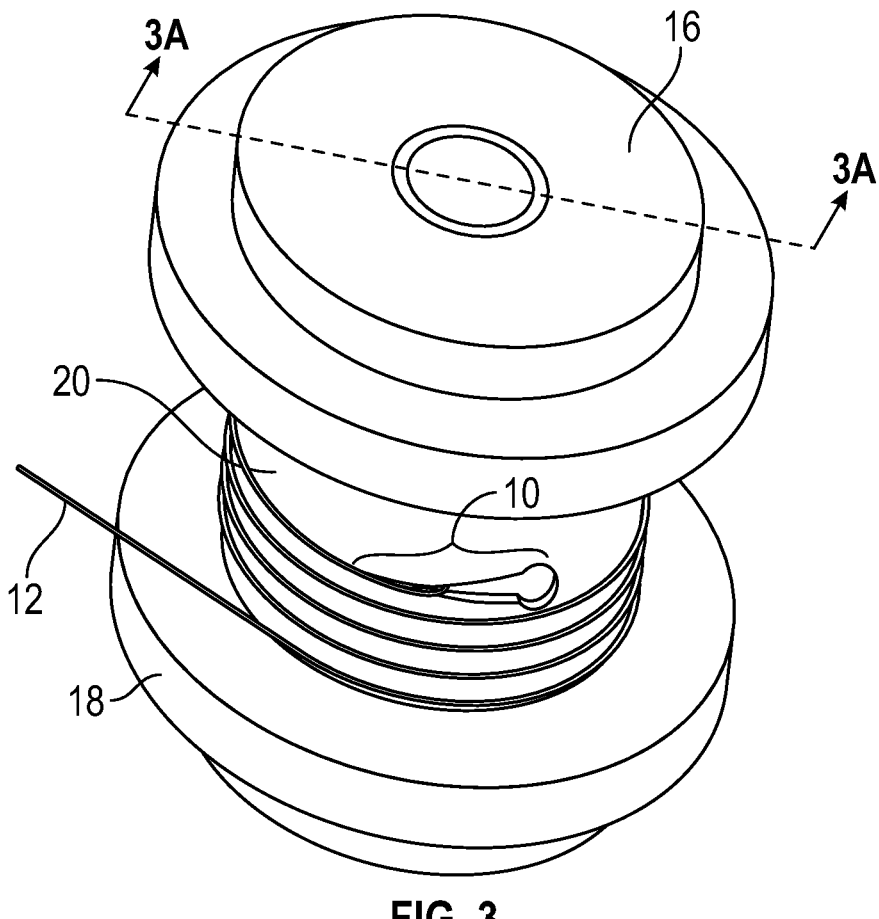
Figure 4:
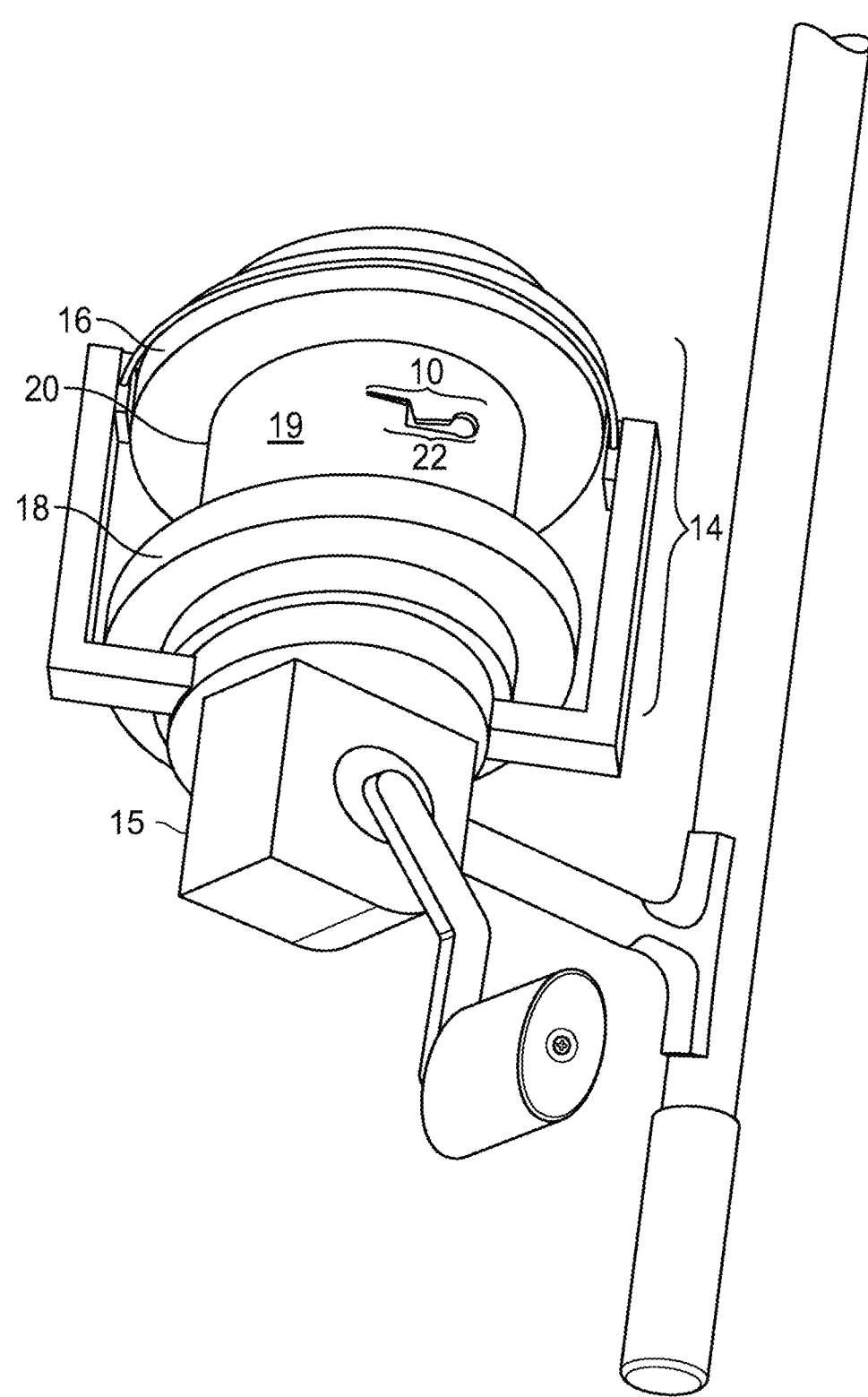
Figure 5:
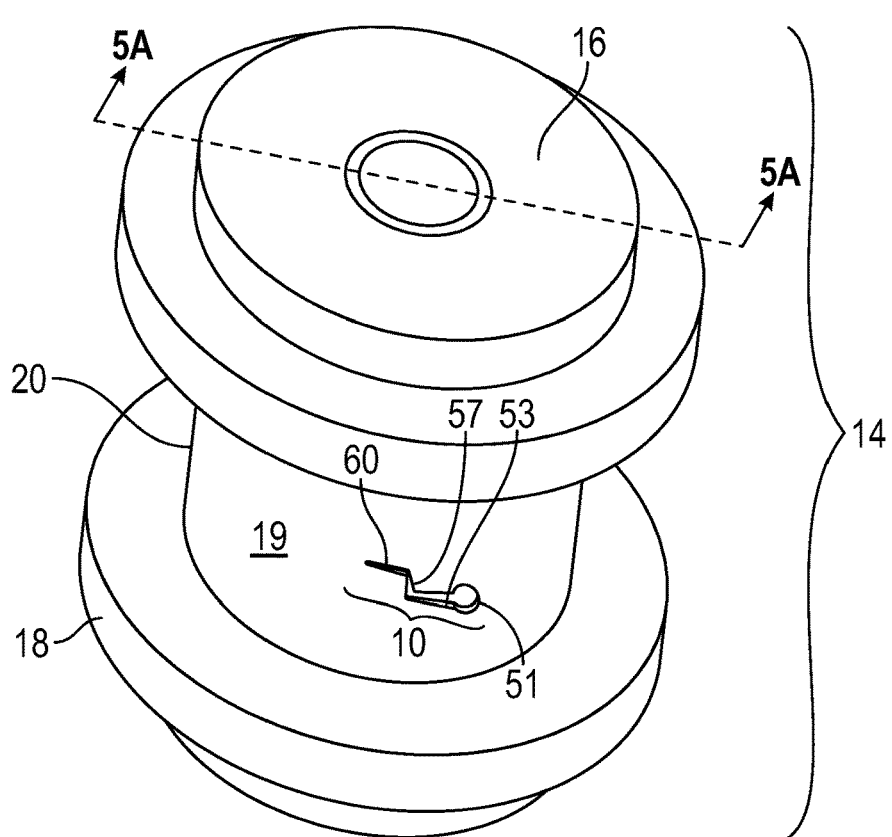
Figure 6:
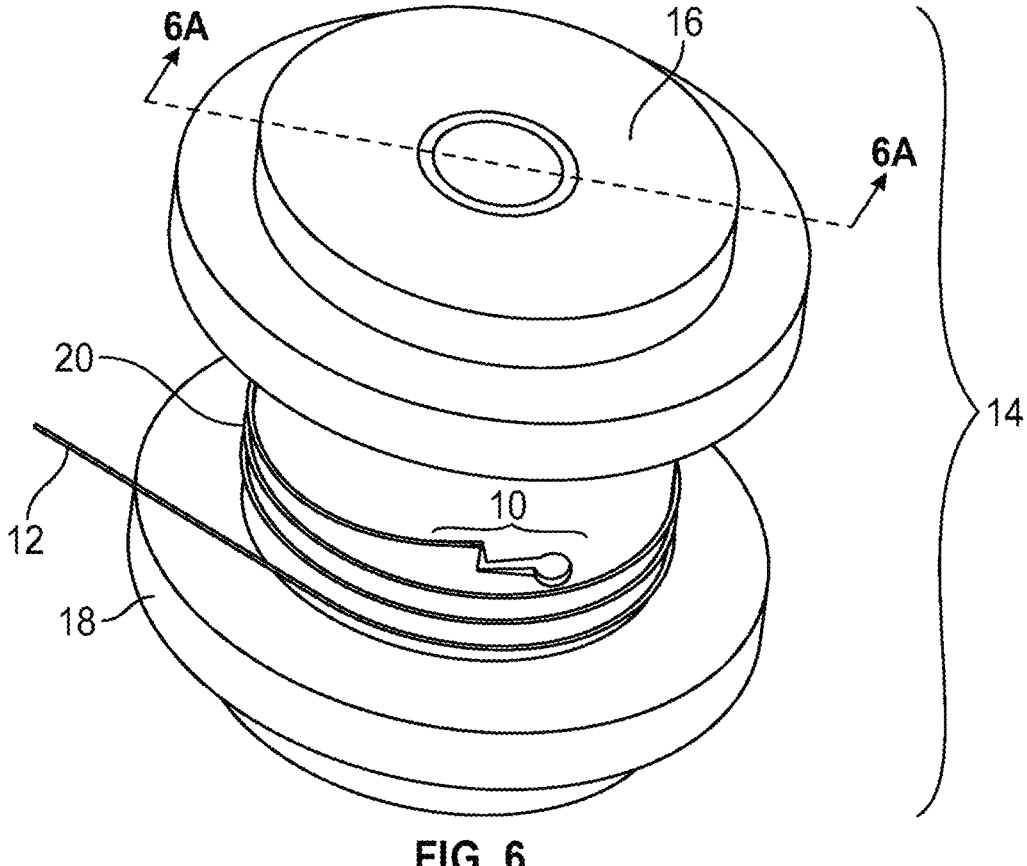

Referring generally to FIGS. 1-6B, the present disclosure is directed to a fishing line attachment mechanism (10) and method of use intended to conveniently receive and effectively retain a knotted fishing line (12) on a spool (14) of a fishing reel (15). Particularly, FIGS. 1-3 are directed to a first aspect of the fishing line attachment mechanism (10). FIGS. 4-6 are directed to a second aspect of the fishing line attachment mechanism (10). Both aspects of the fishing line attachment mechanism (10) may be utilized with varying weights of fishing line (12) and across different styles and manufacturers of fishing reels (15). While certain aspects of the present disclosure are shown and described herein, it is understood that such aspects are merely exemplary. The present disclosure is not intended to be limited to these specific aspects and may encompass other aspects or embodiments. Therefore, specific structural and functional details disclosed herein are not to be interpreted or inferred as limiting, but merely as a basis for the claims and as a representative basis for teaching one skilled in the art how to make and use the disclosed subject matter.

It must be noted that the singular terms "a," "an," and "the" as used herein may include plural referents unless the context clearly dictates otherwise. As used herein, in particular aspects, the terms "about" or "approximately" when preceding a numerical value indicates the value plus or minus a range of 0.05, 0.1, 0.2, 0.3, 0.4 or 0.5 millimeter. Furthermore, the transitional phrase "comprising" that is synonymous with "including," "containing," and "characterized by" as used herein is inclusive or open-ended and does not exclude additional, unrecited elements, steps or ingredients. Alternatively, the transitional phrase "consisting of" as used herein is closed and excludes any element, step or ingredient not specified. The term "generally" as used herein is defined as being mostly but not necessarily wholly that which is specified. The term "wider" as used herein is defined as exceeding most other things of like kind, especially in size. The term "narrower" as used herein is defined as having a comparatively little size or slight dimensions. The term "on" as used herein is defined as forming a distinctive part of the surface, including as an integral part of the surface or alternatively attached to the surface.

FIG. 1 illustrates a front-top perspective view of the first aspect of the attachment mechanism (10) with an exemplary fishing reel (15) attached to a fishing rod. The fishing reel (15) may comprise a spool (14) the spool having a top flange (16), a bottom flange (18), and a barrel (20) connecting the top flange (16) to the bottom flange (18). The spool (14) may comprise the fishing line attachment mechanism (10). The fishing line attachment mechanism (10) is designed to retain a fishing line (12) on the barrel (20), namely, between the top flange (16) and the bottom flange (18), while using the fishing reel (15). As depicted in FIG. 1, the attachment mechanism (10) may be positioned on a wall (19) of the barrel (20) at a location approximately midpoint between the top flange (16) and the bottom flange (18). In other instances, the attachment mechanism (10) may be positioned approximately adjacent to the top flange (16) or the bottom flange (18). In further instances, the attachment mechanism (10) may be positioned at any location on a wall (19) of the barrel (20) between the top flange (16) and bottom flange (18).

Figure 2A:
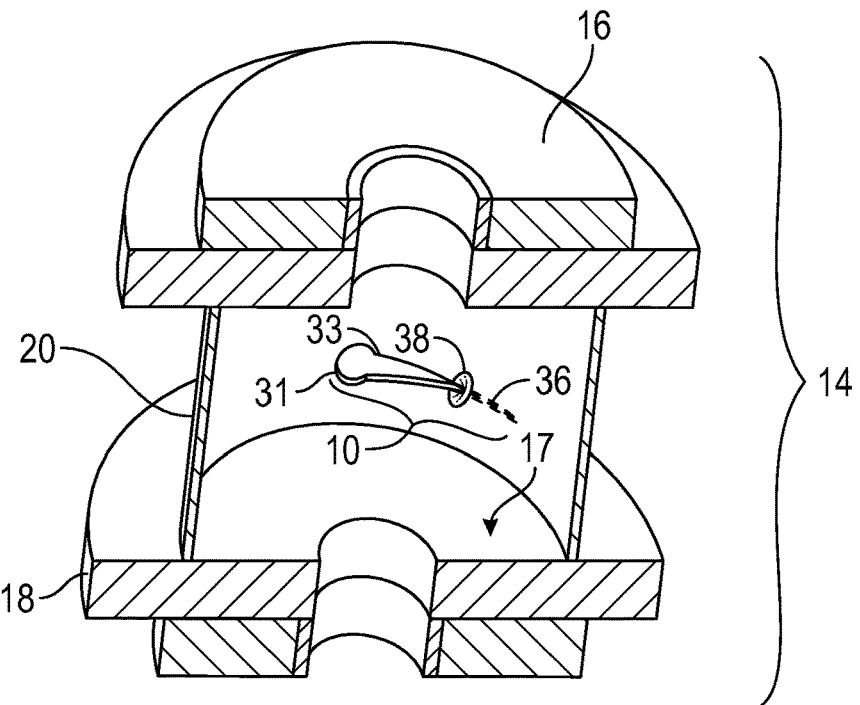
FIG. 2A is a cross-sectional interior view of the spool showing the rear side of the fishing line attachment mechanism of FIG. 2.
Figure 2B:
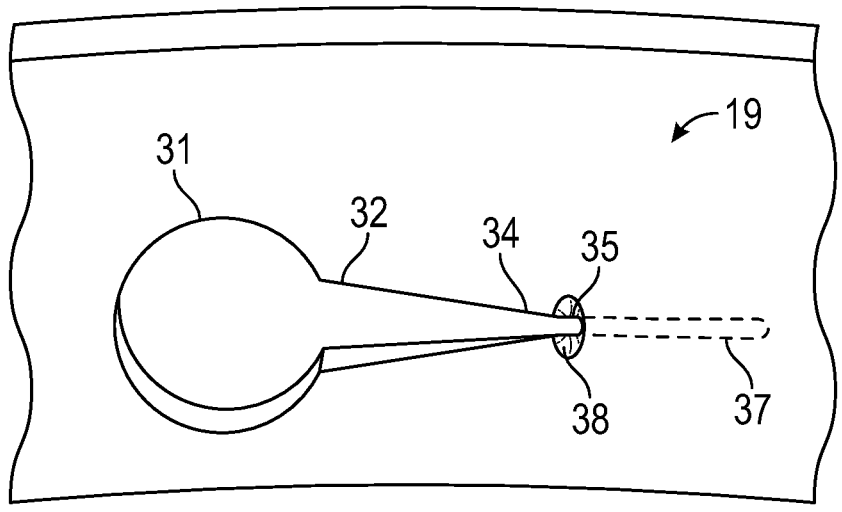
FIG. 2B is a magnified rear side view of the fishing line attachment mechanism of FIG. 2A.

FIG. 2 illustrates a perspective exterior view of the spool (14) showing the front side of the fishing line attachment mechanism (10) without the fishing line (12) attached. FIG. 2A illustrates a cross-sectional interior view of the spool (14) along axis 2A showing the rear side of the fishing line attachment mechanism (10) of FIG. 2. FIG. 2B illustrates a magnified rear view of the fishing line attachment mechanism of FIG. 2A. Shown in FIGS. 2, 2A, 2B, the fishing line attachment mechanism (10) may comprise a head portion (31), an opposite tail portion (36), and a body portion (33) connecting the head portion (31) to the tail portion (36). In particular, the head portion (31), body portion (33) and tail portion (36) of the fishing line attachment mechanism (10) may comprise an aperture (22) that extends from an exterior surface of the barrel (20), through the wall (19), and into an interior cavity (17) of the barrel (20). It is also contemplated that the aperture (22) may extend from the exterior surface of the barrel (20) to a location in the wall (19) midway between the exterior surface (20) and interior cavity (17) of the barrel such that the aperture of fishing line attachment mechanism (10) forms a pocket hole configured to retain the fishing line (12). The pocket hole allows the fishing line to be retained without entering into the internal cavity (17) of the reel (14) to prevent the knot (11) of the fishing line (12) from interacting with internal mechanisms of the reel (14). An overall length of the fishing line attachment mechanism (10) may range approximately 6.00 to 13.00 millimeters and an overall width may range approximately 0.05 to 2.50 millimeters.

Further shown in FIGS. 2, 2A, 2B, the head portion (31) may be generally round in shape and comprise a diameter of approximately [1.50 to 2.50 millimeters. While the head portion (31) is depicted in FIG. 2 as comprising a circular shape, it is contemplated by the present disclosure that other shapes may also be utilized by the head portion (31) such as, e.g., oval, pentagon, hexagon, octagon, polygon. The head portion (31) includes an aperture (22) that extends from the exterior surface of the barrel (20), through the wall (19), and into the interior cavity (17) of the barrel (20).

Still further shown in FIGS. 2, 2A, 2B, the body portion (33) may be generally triangular in shape and comprise a wider first end (32) and an opposite, narrower second end (34). The body portion (33) may have an elongated length of approximately 2.00 to 8.00 millimeters and a width that ranges between approximately 0.10-3.00 millimeters. As shown in FIG. 2, the elongated length of the body portion (33) may extend parallel to a direction fishing line (12) is wound on the spool (14). In other instances, the body portion (33) may extend perpendicular to the direction the fishing line (12) is wound on the spool (14). While the body portion (33) is depicted in FIG. 2 as comprising an isosceles triangular shape, it is contemplated by the present disclosure that other types of triangular shapes may also be utilized by the body portion (33) such as, e.g., equilateral, right, or acute. The first end (32) of the body portion (33) may be connected to the head portion (31), wherein the head portion (31) leads into the body portion (33). The body portion (33) includes an aperture (22) that extends from the exterior surface of the barrel (20), through the wall (19), and into the interior cavity (17) of the barrel (20).

Also shown in FIGS. 2, 2A, 2B, the tail portion (36) may comprise a first end (35) and an opposite second end (37). The first end (35) of the tail portion (36) may be connected to the second end (34) of the body portion (33), wherein the body portion (33) leads into the tail portion (36). The first end (35) of the tail portion (36) may include an aperture (22) that extends from the exterior surface of the wall (19) of the barrel (20), through the wall (19), and into the interior cavity (17) of the barrel (20). The aperture (22) of the first end (35) of the tail portion (36) may further be surrounded by a seating (38) positioned on an interior surface of the wall (19) of the barrel (20). The seating (38) may comprise an indentation on the interior surface of the wall (19) of the barrel (20) approximately 0.10-2.00 millimeters in diameter and approximately 0.20-0.60 millimeter in depth. In other instances, the indenture of the seating (38) may comprise up to two-thirds the thickness of the wall (19). While the seating (38) is depicted in FIG. 2A as comprising a circular shape, it is contemplated by the present disclosure that other types of shapes may also be utilized by the seating (38) such as, e.g., square, oval, pentagon, hexagon, octagon, polygon.

Shown in FIGS. 2, 2A, 2B, the first end (35) of the tail portion (36) may smoothly transition into a linear groove in the wall (19) of the barrel (20) where it gradually tapers in depth to the second end (37). The second end (37) of the tail portion (36) may progressively become flush with the exterior surface of the barrel (20). In some instances, the tail portion (36) may be approximately 1.0-8.0 millimeters in overall length and approximately 0.10 to 1.5 millimeters in overall width. In other instances, the tail portion (36) may comprise an approximate length of at least one fourth an overall length of the fishing line attachment mechanism (10). In further instances, the tail portion (36) may be slightly wider than width of the fishing line (12). The tail portion (36) may extend parallel to the direction fishing line (12) is wound on the spool (14).

Figure 3A:
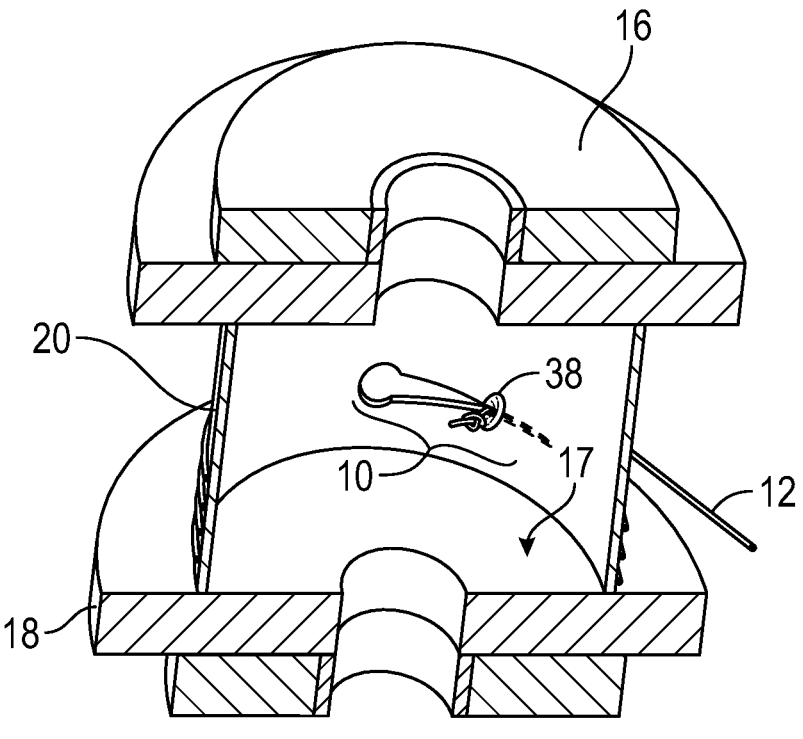
FIG. 3A is a cross-sectional interior view of the spool showing the rear side of the fishing line attachment mechanism of FIG. 3.
Figure 3B:
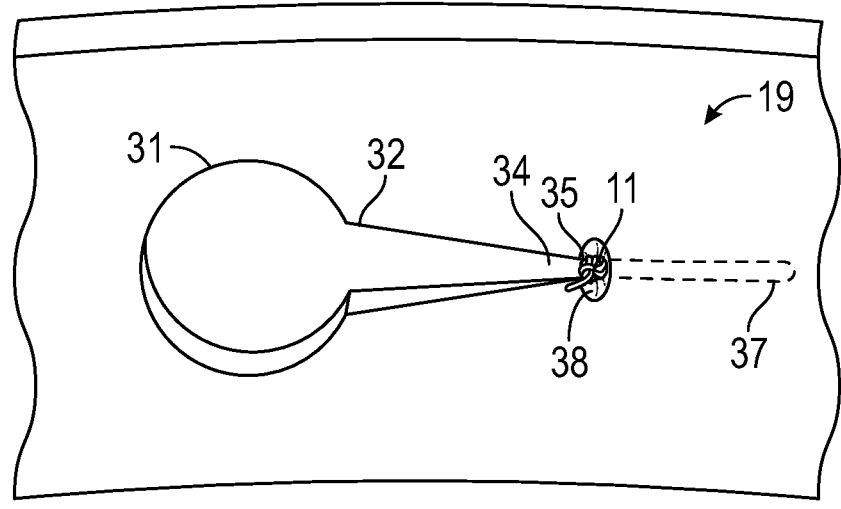
FIG. 3B is a magnified rear side view of the fishing line attachment mechanism of FIG. 3A.

FIG. 3 illustrates a perspective exterior view of the spool (14) showing the front side of the fishing line attachment mechanism (10) with a fishing line (12) attached. FIG. 3A illustrates a cross-sectional interior view of the spool (14) along axis 3A showing the rear side of the fishing line attachment mechanism (10) of FIG. 3. FIG. 3B illustrates a magnified rear view of the fishing line attachment mechanism of FIG. 3A. Shown in FIGS. 3, 3A, 3B, the fishing line (12) may comprise a knotted end (11) and an opposite, open end (13) for attaching a fishing hook or fishing lure (not shown). The knotted end (11) may comprise a convenient and simple single-strand stopper knot commonly utilized in the fishing industry such as, e.g., an overhand knot, a FIG. 8 knot, or a slip knot. The head portion (31) of the fishing line attachment mechanism (10) is configured to be of a sufficient size to receive the knotted end (11) of the fishing line (12) therethrough. In particular, the knotted end (11) may be received in the head portion (31) where it further enters an interior cavity (17) of the barrel (20).

Further shown in FIGS. 3, 3A, 3B, the fishing line (12) comprising knotted end (11) may be guided from the head portion (31) into the first end (32) of the body portion (33). The triangular shape of the body portion (33) assists in further directing the fishing line (12) towards the second end (34) of the body portion (33) where it enters the aperture (22) of the first end (35) of the tail portion (36). As the fishing line (12) enters the aperture (22) of the first end (35) of the tail portion, the knotted end (11) may lodge in the seating (38) positioned on the interior surface of the wall (19) of the barrel (20). The indentation of the seating (38) is designed to fit the size and dimensions of the knotted end (11) of the fishing line (12). The seating (38) is configured to engage with the knotted end (11) to help prevent movement and slippage of the fishing line (12) within the fishing line attachment mechanism (10). The seating (38) further improves retention of the knotted end (11) within the fishing line attachment mechanism (10) and lessens external forces on the fishing line (12) when engaged with the aperture (22) of the first end (35) of the tail portion (36) to prevent breakage of the fishing line (12) during use.

Still further shown in FIGS. 3, 3A, 3B, the fishing line attachment mechanism (10) progressively narrows from the head portion (31) to the body portion (33) and further to the tail portion (36). Thus, after the fishing line (12) enters the aperture (22) at the first end (35) of the tail portion (36), the knotted end (11) will engage with the seating (38) and prevent the knotted end (11) from sliding back through the fishing line attachment mechanism (10). The knotted end (11) of the fishing line (12) is too large to exit, or be pulled through, the narrowed aperture (22) at the first end (35) of the tail portion (36). The knotted end (11) of the fishing line (12) is therefore retained in seating (38) of the fishing line attachment mechanism (10) and within interior cavity (17) of the barrel (20). The remainder of the fishing line (12), including the open end (13), may extend outside the first end (35) of the tail portion (36) to be wound around the exterior surface of the barrel (20) of the spool (14) and be further attached to the fishing hook or lure (not shown). In particular, the remainder of the fishing line (12) may extend outside the aperture (22) at the first end (35) of the tail portion (36) and smoothly transition into the linear groove of the tail portion (36) to prevent breakage or slippage of the fishing line (12) during use. The fishing line (12) may further advance within the linear groove of the tail portion (36) to the second end (37) of the tail portion (36) as the linear groove progressively becomes flush with the exterior surface of the barrel (20). Thus, in this manner the fishing line (12) is conveniently and securely attached to the fishing line attachment mechanism (10) of the present disclosure while providing for a smoother and more gradual entry of the fishing line (12) onto the spool (14) to eliminate protrusions caused by traditional means of attaching fishing line (12).

FIG. 4 illustrates a front-top perspective view of the second aspect (50) of the attachment mechanism (10) with an exemplary fishing reel (15) attached to a fishing rod. The fishing reel (15) may comprise a spool (14), the spool having a top flange (16), a bottom flange (18), and a barrel (20) connecting the top flange (16) to the bottom flange (18). The spool (14) may comprise the fishing line attachment mechanism (10). The fishing line attachment (10) is designed to retain the fishing line (12) on the barrel (20), namely, between the top flange (16) and the bottom flange (18), while using the fishing reel (15). As depicted in FIG. 4, the attachment mechanism (10) may be positioned on an exterior surface of the wall (19) of the barrel (20) at a location approximately midpoint between the top flange (16) and the bottom flange (18). In other instances, the attachment mechanism (10) may be positioned approximately adjacent to the top flange (16) or the bottom flange (18). In further instances, the attachment mechanism (10) may be positioned at any location on the wall (19) of the barrel (20) between the top flange (16) and bottom flange (18).

Figure 5A:
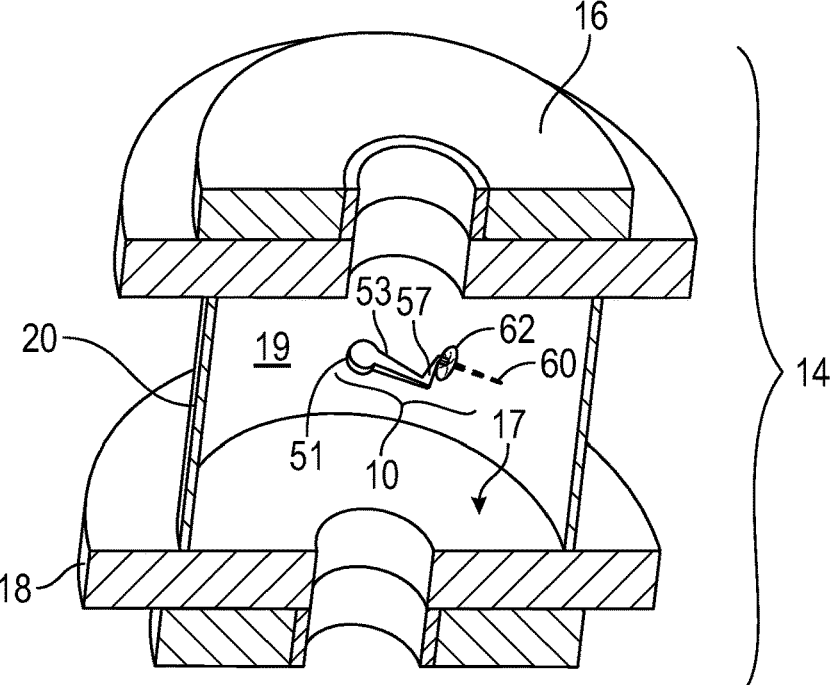
FIG. 5A is a cross-sectional interior view of the spool showing the rear side of the fishing line attachment mechanism of FIG. 5.
Figure 5B:
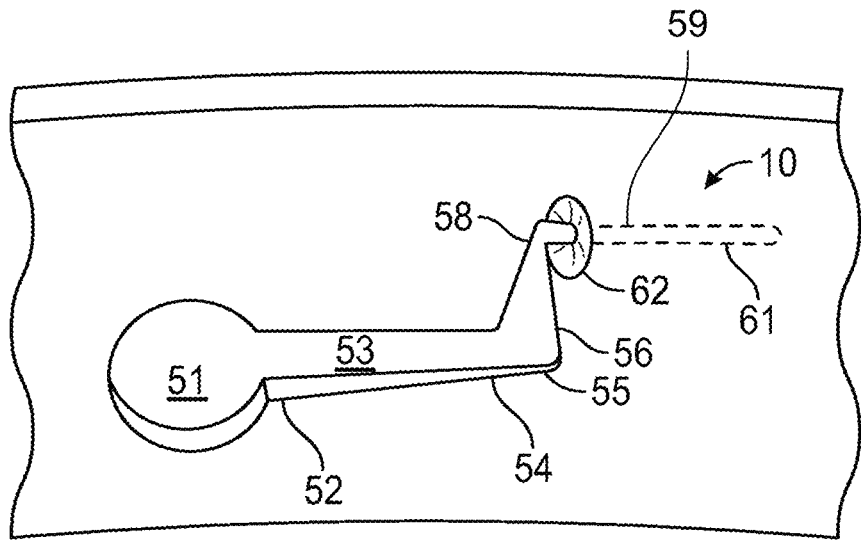
FIG. 5B is a magnified rear side view of the fishing line attachment mechanism of FIG. 4A.

FIG. 5 illustrates a perspective exterior view of the spool (14) showing the front side of the fishing line attachment mechanism (10) without the fishing line (12) attached. FIG. 5A illustrates a cross-sectional interior view of the spool (14) along axis 5A showing the rear side of the fishing line attachment mechanism (10) of FIG. 5. FIG. 5B illustrates a magnified rear view of the fishing line attachment mechanism of FIG. 5A Shown in FIGS. 5, 5A, 5B, the fishing line attachment mechanism (10) may comprise a head portion (51), an opposite tail portion (60), a body portion (53), and an arm portion (57). In particular, the head portion (51), the body portion (53), the arm portion (57), and the tail portion (60) of the fishing line attachment mechanism (10) may comprise an aperture (22) that extends from an exterior surface of the barrel (20), through the wall (19), and into an interior cavity (17) of the barrel (20).It is also contemplated that the aperture (22) may extend from the exterior surface of the barrel (20) to a location in the wall (19) midway between the exterior surface (20) and interior cavity (17) of the barrel such that the aperture of fishing line attachment mechanism (10) forms a pocket hole configured to retain the fishing line (12). The pocket hole allows the fishing line to be retained without entering into the internal cavity (17) of the reel (14) to prevent the knot (11) of the fishing line (12) from interacting with internal mechanisms of the reel (14). An overall length of the fishing line attachment mechanism (10) may range approximately 6.00-13.00 millimeters and an overall width may range approximately 0.05-2.50 millimeters.

Further shown in FIGS. 5, 5A, 5B, the head portion (51) may be generally round in shape and comprise a diameter of approximately 1.50-2.50 millimeters. While the head portion (51) is depicted in FIG. 5 as comprising a circular shape, however, it is contemplated by the present disclosure that other shapes may also be utilized by the head portion (51) such as, e.g., oval, pentagon, hexagon, octagon, polygon. The head portion (51) includes an aperture (22) that extends from the exterior surface of the barrel (20), through the wall (19), and into the interior cavity (17) of the barrel (20).

Still further shown in FIGS. 5, 5A, 5B, the body portion (53) may be generally triangular in shape and comprise a wider first end (52) and an opposite, narrower second end (54). The body portion (53) may have an elongated length of approximately 2.00-8.00 millimeters and a width of approximately 0.10-3.00 millimeters. As shown in FIG. 5, the elongated length of the body portion (53) may extend parallel to a direction fishing line (12) is wound on the spool (14). In other instances, the body portion (53) may extend perpendicular to the direction the fishing line (12) is wound on the spool (14). While the body portion (53) is depicted in FIG. 5 as comprising an isosceles triangular shape, it is contemplated by the present disclosure that other types of triangular shapes may also be utilized by the body portion (53) such as, e.g., equilateral, right, or acute. The first end (52) of the body portion (53) may be connected to the head portion (51), wherein the head portion (51) leads into the body portion (53). The body portion (53) includes an aperture (22) that extends from the exterior surface of the barrel (20), through the wall (19), and into the interior cavity (17) of the barrel (20).

Also shown in FIGS. 5, 5A, 5B, the arm portion (57) may comprise a wider first end (56) and an opposite, narrower second end (58). The arm portion (57) may have an elongated length of approximately 0.50-4.00 millimeters and a width that ranges between approximately 0.10-2.00 millimeters. The elongated length of the arm portion (57) should extend perpendicular to the direction of the body portion (53). The arm portion (57) is designed to prevent the fishing line (12) from becoming detached from the spool (14) by limiting potential movement of the fishing line (12) at the end of the arm portion (57). As depicted in FIG. 5, the arm portion (57) may extend perpendicular to the direction of the tail portion (60). In other instances, the arm portion (57) may extend parallel to the direction of the tail portion (60). The first end (56) of the arm portion (57) may be connected to the second end (54) of the body portion (53), wherein the body portion (53) leads into the arm portion (57). The second end (58) of the arm portion (57) may be connected to the first end (59) of the tail portion (60), wherein the arm portion (57) leads into the tail portion (60). The arm portion (57) includes an aperture (22) that extends from the exterior surface of the wall (19) of the barrel (20), through the wall (19), and into the interior cavity (17) of the barrel (20). The second end (54) of the body portion (53) meets the first end (56) of the arm (57) at a shoulder (55). The shoulder may be rounded-off or curved to prevent breakage of the fishing line (12) as the fishing line transitions from the body portion (53) to the arm portion (57). Alternatively, the shoulder (55) may be a sharp corner, e.g., a right corner.

Shown in FIGS. 5, 5A, 5B, the tail portion (60) may comprise a first end (59) and an opposite second end (61). The first end (59) of the tail portion (60) may be connected to the second end (58) of the arm portion (57), wherein the arm portion (57) leads into the tail portion (60). The first end (59) of the tail portion (60) may include an aperture (22) that extends from the exterior surface of the barrel (20), through the wall (19), and into the interior cavity (17) of the barrel (20). The aperture (22) at the first end (59) of the tail portion (60) may further be surrounded by a seating (62) positioned on an interior surface of the wall (19) of the barrel (20). The seating (62) may comprise an indentation on the interior surface of the wall (19) of the barrel (20) approximately 0.10-2.00 millimeter in diameter and approximately 0.20-0.60 millimeter in depth. In other instances, the indenture of the seating (62) may comprise up to two-thirds the thickness of the wall (19). While the seating (62) is depicted in FIG. 5A as comprising a circular shape, however, it is contemplated by the present disclosure that other types of shapes may also be utilized by the seating (62) such as, e.g., square, oval, pentagon, hexagon, octagon, polygon. When the fishing line (12) is engaged with the tail (53) and a seating (62)

after passing through the arm portion (57) it becomes more difficult for the fishing line (12) to become dislodged from the fishing line attachment mechanism (10) due to the limited directions which are available for the fishing line (12) to move.

Further shown in FIGS. 5, 5A, 5B, the first end (59) of the tail portion (60) may smoothly transition into a linear groove in the wall (19) of the barrel (20) where it gradually tapers in depth to the second end (61). The second end (61) of the tail portion (60) may progressively become flush with the exterior surface of the barrel (20). In some instances, the tail portion (60) may be approximately 1.0-8.00 millimeters in overall length and approximately 0.10-1.50 millimeter in overall width. In other instances, the tail portion (60) may comprise an approximate length of at least one fourth an overall length of the fishing line attachment mechanism (10). In further instances, the tail portion (60) may be slightly wider than width of the fishing line (12). The tail portion (60) may extend parallel to the direction fishing line (12) is wound on the spool (14).

Figure 6A:
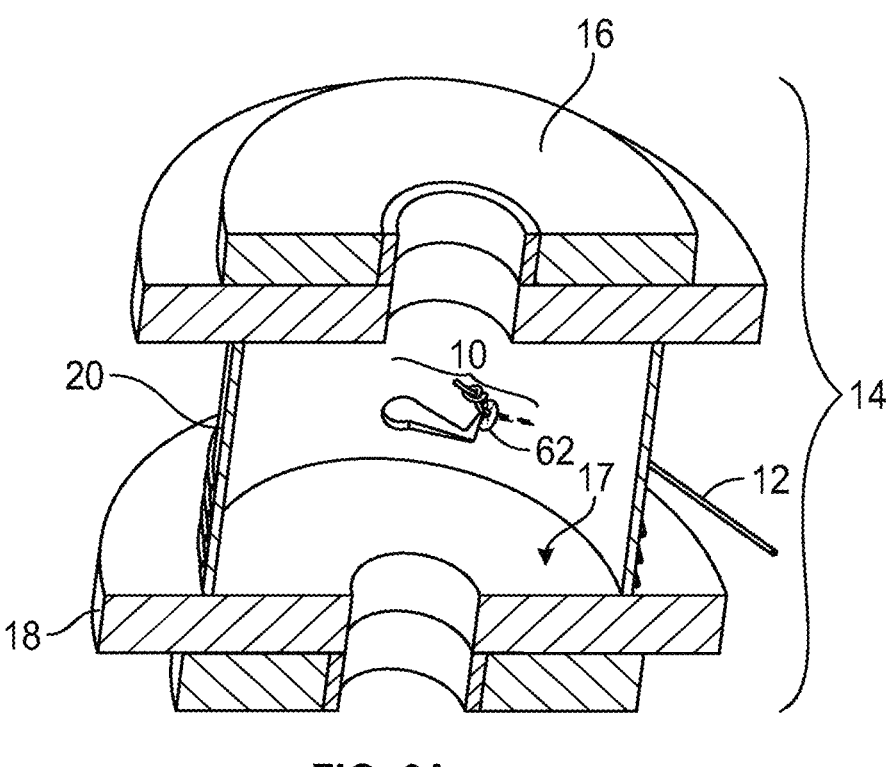
FIG. 6A is a cross-sectional interior view of the spool showing the rear side of the fishing line attachment mechanism of FIG. 6.
Figure 6B:
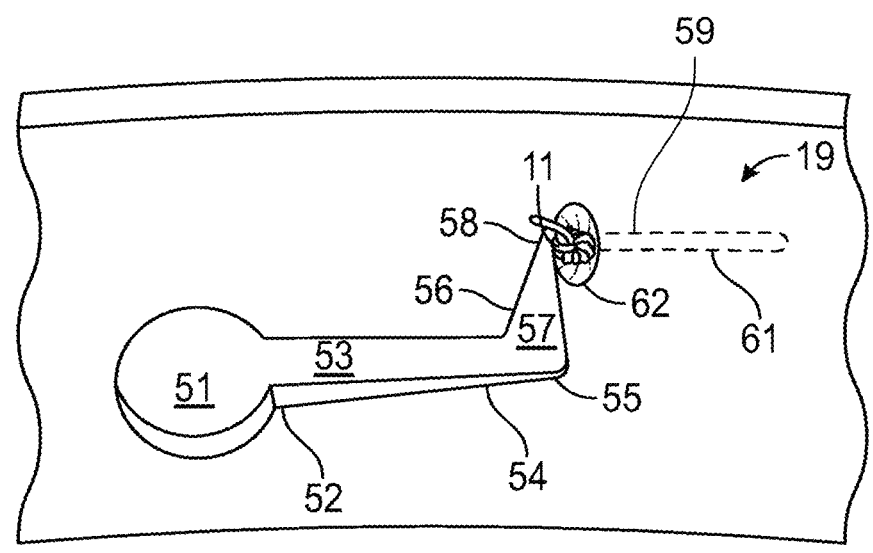
FIG. 6B is a magnified rear side view of the fishing line attachment mechanism of FIG. 6A.

FIG. 6 illustrates a perspective exterior view of the spool (14) showing the front side of the fishing line attachment mechanism (10) with a fishing line (12) attached. FIG. 6A illustrates a cross-sectional interior view of the spool (14) along axis 6A showing the rear side of the fishing line attachment mechanism (10) of FIG. 6. FIG. 6B illustrates a magnified rear view of the fishing line attachment mechanism of FIG. 6A. Shown in FIGS. 6, 6A, 6B, the fishing line (12) may comprise a knotted end (11) and an opposite open end for attaching a fishing hook or fishing lure (not shown). The knotted end (11) may comprise a convenient and simple single-strand stopper knot commonly utilized in the fishing industry, such as, e.g., an overhand knot, a FIG. 8 knot, or a slip knot. The head portion (51) of the fishing line attachment mechanism (10) is configured to be of a sufficient size to receive the knotted end (11) of the fishing line (12) therethrough. In particular, the knotted end (11) may be received in the head portion (51) where it further enters the interior cavity (17) of the barrel (20).

Further shown in FIGS. 6, 6A, 6B, the fishing line (12) comprising a knotted end (11) may be guided from the head portion (51) into the first end (52) of the body portion (53). The triangular shape of the body portion (53) further directs the fishing line (12) towards the second end (54) of the body portion (53) where the fishing line (12) then enters the first end (56) of the arm portion (57). The shoulder (55) assists in further directing the fishing line (12) towards arm portion (57). The triangular shape of the arm portion (57) assists in further directing the fishing line (12) towards the first end (59) of the tail portion (60). As the fishing line (12) enters the first end (59) of the tail portion (60), the knotted end (11) may lodge in the seating (62) positioned on the interior surface of the wall (19) of the barrel (20). The indentation of the seating (62) is designed to fit the size and dimensions of the knotted end (11) of the fishing line (12). The seating (62) is configured to engage with the knotted end (11) of the fishing line (12) to help prevent movement and slippage of the fishing line (12) within the fishing line attachment mechanism (10). The seating (62) further improves retention of the knotted end (11) within the fishing line attachment mechanism (10) and lessens external forces on the fishing line (12) when engaged with the first end (59) of the tail portion (60) to prevent breakage of the fishing line (12) during use.

Still further shown in FIGS. 6, 6A, 6B the fishing line attachment mechanism (10) progressively narrows from the head portion (51) to the body portion (53), further narrowing to the arm portion (57) and still further to the tail portion (60). Thus, after the fishing line (12) enters the aperture (22) at the first end (59) of the tail portion (60), the knotted end (11) will engage with the seating (62) and prevent the knotted end (11) from sliding back through the fishing line attachment mechanism (10). The knotted end (11) of the fishing line (12) is too large to exit, or be pulled through, the narrowed aperture (22) at the first end (59) of the tail portion (60). The knotted end (11) of the fishing line (12) is therefore retained in seating (62) of the fishing line attachment mechanism (10) and within interior cavity (17) of the barrel (20). The remainder of the fishing line (12), including the open end, may extend outside the first end (59) of the tail portion (60) to be wound around the exterior surface of the barrel (20) of the spool (14) and further attached to the fishing hook or lure (not shown). In particular, the remainder of the fishing line (12) may extend outside the aperture (22) at the first end (59) of the tail portion (60) and smoothly transition into the linear groove to prevent breakage or slippage of the fishing line (12) during use. The fishing line (12) may further advance within the linear groove to the second end (61) of the tail portion (60) as the linear groove progressively becomes flush with the exterior surface of the barrel (20). Thus, in this manner the fishing line (12) is conveniently and securely attached to the fishing line attachment mechanism (10) of the present disclosure while providing for a smoother and more gradual entry of the fishing line (12) onto the spool (14) to eliminate protrusions caused by traditional means of attaching fishing line (12).

Another aspect of the present disclosure is a method of using the fishing line attachment mechanism (10) of FIGS. 1-6B. In particular, the method may comprise providing a fishing line (12) with a knotted end (11), and a fishing reel (15) having a spool (14). The spool (14) should include a fishing line attachment device (10). The fishing line attachment device may include a head portion (31), a body portion (33) and a tail portion (36). In particular, the fishing line attachment mechanism (10) progressively narrows from the head portion (31) to the body portion (33) and further to the tail portion (36). The tail portion (36) includes a linear groove which tapers from the first end (35) to the second end (37) of the tail portion (36). The second end (37) of the tail portion (36) may progressively become flush with the exterior surface of the barrel (20). The method may comprise inserting the knotted end (11) of the fishing line (12) to the fishing line attachment mechanism (10) at the head (31), guiding the line (12) into the body (33) and pulling until the knot (11) is securely engaged in a seating (38) at a first end (35) of the tail portion (36). Thus, after the fishing line (12) enters an aperture (22) at the first end (35) of the tail portion (36), the knotted end (11) will engage with the seating (38) and prevent the knot (11) from sliding back through the fishing line attachment mechanism (10). The knotted end (11) of the fishing line (12) is therefore retained in seating (38) of the fishing line attachment mechanism (10) and within interior cavity (17) of the barrel (20). The remainder of the fishing line (12), including the open end (13), may extend outside the first end (35) of the tail portion (36) to be wound around the exterior surface of the barrel (20) of the spool (14) and further attached to the fishing hook or lure (not shown).

Alternatively, the fishing line attachment mechanism may comprise a head portion (51), a body portion (53), an arm portion (57), and a tail portion (60). In the alternative aspect, the fishing line attachment mechanism (10) progressively narrows from the head portion (51) to the body portion (53) and further through the arm portion (57) to tail portion (60).

The tail portion (60) includes a linear groove which tapers from the first end (59) to the second end (61) of the tail portion (60). The second end (61) of the tail portion (60) may progressively become flush with the exterior surface of the barrel (20). The method may include inserting the knotted end (11) of the fishing line (12) into the head (51) of the fishing line attachment mechanism (10), guiding the line (12) through the body (53), further into the arm portion (57), and pulling until the knot (11) is securely engaged in a seating (62) at a first end of the tail portion (59). Thus, after the fishing line (12) enters the aperture (22) at the first end (59) of the tail portion (60), the knotted end (11) will engage with the seating (62) and prevent the knot from sliding back through the fishing line attachment mechanism (10). The knotted end (11) of the fishing line (12) is therefore retained in seating (62) of the fishing line attachment mechanism (10) and within interior cavity (17) of the barrel (20). The remainder of the fishing line (12), including the open end, may extend outside the first end (59) of the tail portion (60) to be wound around the exterior surface of the barrel (20) of the spool (14) and further attached to the fishing hook or lure (not shown).

The attachment mechanism (10) and method of use of the present disclosure are universally applicable to various makes, models, and manufacturers of fishing reels, including, e.g., spinning reels, spincast reels, and baitcast reels. Although the disclosure has been described and illustrated with respect to preferred aspects thereof, it is not to be so limited since changes, modifications, and combinations thereof may be made which are within the full intended scope of the disclosure.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A spool, comprising:

a top flange;

a bottom flange;

a barrel connecting the top flange to the bottom flange;

a fishing line attachment mechanism on the barrel;

the fishing line attachment mechanism comprising:

a) a head;

b) a body;

c) the body attached to the head;

d) a tail;

e) the tail having a first end and a second end; and (f) a seating;

the body, the head, and the first end of the tail extending through a wall of the barrel;

the fishing line attachment mechanism configured to retain a knotted end of a fishing line;

the seating being an indented portion on an inside surface of the barrel at a point where the body meets the tail; and the seating configured to engage the knotted end of the fishing line.

2. The spool of claim 1, further comprising:

the fishing line attachment mechanism having an arm, the arm connecting the body to the tail.

3. The spool of claim 2, wherein the fishing line attachment mechanism further comprises:

a) the body having a first end and an opposite second end;

b) the head connected to the first end of the body;

c) the arm connected to and extending perpendicular from the second end of the body;

d) the tail connected to the arm opposite from the body; and e) the tail extending parallel to the direction of spooling.

4. A fishing line attachment mechanism, comprising:

a head;

a body;

the body having a first end and a second end;

wherein the first end of the body is wider than the second end of the body;

a tail;

the tail having a first end and a second end;

the head, the body, and the first end of the tail configured to extend through a wall of a barrel of a spool for a fishing reel; and wherein the fishing line attachment mechanism is configured to retain a knotted end of a fishing line while fishing.

5. The fishing line attachment mechanism of claim 4, further comprising:

the first end of the tail connected to the body;

the second end of the tail flush with an exterior surface of the barrel; and a depth of the tail being tapered from the first end to the second end.

6. The fishing line attachment mechanism of claim 4, further comprising:

an arm;

the arm connecting the body to the tail.

7. The fishing line attachment mechanism of claim 6, further comprising:

the seating being an indented portion on an inside of the barrel at a point where the body meets the tail; and the seating configured to engage the knotted end of the fishing line.

8. The fishing line attachment mechanism of claim 6, further comprising:

the body having a first end and an opposite second end;

the head connected to the first end of the body;

the arm connected to and extending perpendicular from the second end of the body;

the tail connected to the arm opposite from the body; and the tail extending parallel to a direction of spooling.

9. The fishing line attachment mechanism of claim 8, wherein the tail comprises a first end and a second end;

the first end connected to the arm; and a depth of the tail being tapered from the first end to the second end.

10. The fishing line attachment mechanism of claim 6, further comprising a seating.

11. The fishing line attachment mechanism of claim 4, further comprising a seating.

12. The fishing line attachment mechanism of claim 11, further comprising:

the seating being an indented portion on an inside of the barrel at a point where the body meets the tail; and the seating configured to engage the knotted end of the fishing line.

13. The fishing line attachment mechanism of claim 4, wherein the tail comprises at least one-fourth of an overall length of the fishing line attachment mechanism.

14. The fishing line attachment mechanism of claim 4, wherein the tail extends parallel to a direction of spooling.

15. A method of attaching a fishing line to a spool, comprising:

providing a fishing line knotted toward one end;

providing a spool for a fishing reel;

providing a fishing line attachment mechanism;

the fishing line attachment mechanism comprising:

a) a head;

b) a body;

c) a tail;

d) a seating;

e) the head, the body, the tail, and the seating on a barrel of the spool;

f) a depth of the tail tapered from a first end to a second end;

g) the tail configured to allow smooth entry of the fishing line onto the spool; and attaching the fishing line to the spool via the fishing line attachment mechanism.

16. The method of claim 15, further comprising:

inserting the knotted end of the fishing line into the head;

guiding the fishing line into the body;

pulling the fishing line until the knotted end is securely engaged in the seating; and allowing the fishing line to enter the tail;

wherein the tail is configured to allow smooth entry of the fishing line onto the spool.

17. The method of claim 15, wherein the fishing line attachment mechanism further comprises an arm.

18. The method of claim 17, further comprising:

inserting the knotted end of the fishing line into the head;

guiding the fishing line into the body;

further guiding the fishing line into the arm;

pulling the fishing line until the knotted end is securely engaged in the seating; and allowing the fishing line to enter the tail;

wherein the tail is configured to allow smooth entry of the fishing line onto the spool.

19. A fishing line attachment mechanism, comprising:

a head;

a body;

a tail;

the tail having a first end and a second end;

the first end of the tail connected to the body;

the head, the body, and the first end of the tail configured to extend through a wall of a barrel of a spool for a fishing reel;

the second end of the tail flush with an exterior surface of the barrel;

a depth of the tail being tapered from the first end to the second end; and wherein the fishing line attachment mechanism is configured to retain a knotted end of a fishing line while fishing.

20. A fishing line attachment mechanism, comprising:

a head;

a body;

the body having a first end and an opposite second end;

the head connected to the first end of the body;

a tail;

the tail having a first end and a second end;

an arm;

the arm connecting the body to the tail;

the arm connected to and extending perpendicular from the second end of the body;

the tail connected to the arm opposite from the body;

the tail extending parallel to a direction of spooling;

the first end of the tail connected to the arm;

a depth of the tail being tapered from the first end to the second end;

the head, the body, and the first end of the tail configured to extend through a wall of a barrel of a spool for a fishing reel; and wherein the fishing line attachment mechanism is configured to retain a knotted end of a fishing line while fishing.

21. A fishing line attachment mechanism, comprising:

a head;

a body;

a tail:

the tail having a first end and a second end;

the head, the body, and the first end of the tail configured to extend through a wall of a barrel of a spool for a fishing reel;

a seating;

the seating being an indented portion on an inside of the barrel at a point where the body meets the tail;

the seating configured to engage a knotted end of a fishing line; and wherein the fishing line attachment mechanism is configured to retain the knotted end of the fishing line while fishing.

22. A fishing line attachment mechanism, comprising:

a head;

a body;

a tail;

the tail having a first end and a second end;

an arm;

the arm connecting the body to the tail;

the head, the body, and the first end of the tail configured to extend through a wall of a barrel of a spool for a fishing reel;

a seating;

the seating being an indented portion on an inside of the barrel at a point where the body meets the tail;

the seating configured to engage the knotted end of the fishing line; and wherein the fishing line attachment mechanism is configured to retain a knotted end of a fishing line while fishing.

* * * * *